May 20, 1924.
J. E. HAZELTINE
VALVE
Filed Nov. 10 1922
1,494,543
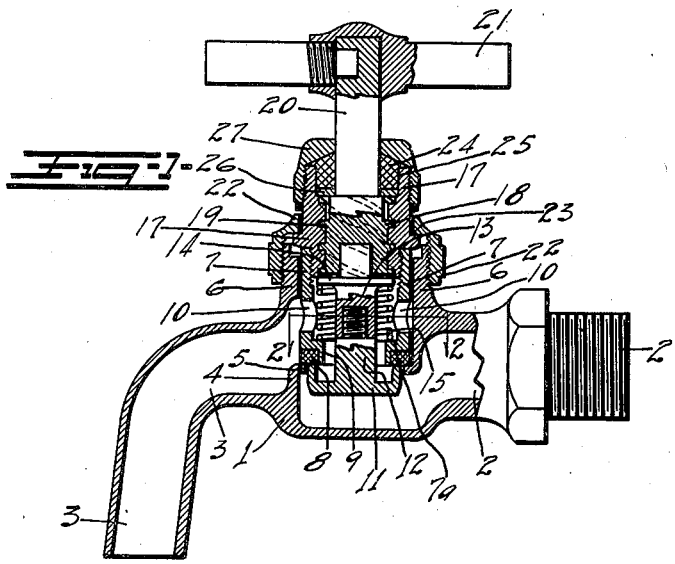
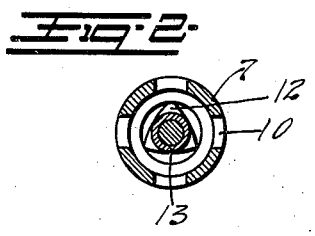
Inventor
James E. Hazeltine
by R. Luf
Attorney Patented May 20, 1924.

1,494,543

UNITED STATES PATENT OFFICE.

JAMES E. HAZELTINE, OF NORTH WARREN, PENNSYLVANIA, ASSIGNOR TO THE BASHLIN COMPANY, OF WARREN, PENNSYLVANIA, A CORPORATION OF PENNSYLVANIA.

VALVE.

Application filed November 10, 1922. Serial No. 600,042.

*To all whom it may concern:*

Be it known that I, JAMES E. HAZELTINE, a citizen of the United States, residing at North Warren, in the county of Warren and State of Pennsylvania, have invented new and useful Improvements in Valves, of which the following is a specification.

This invention is designed to improve valves and while applicable to an ordinary valve structure is of particular advantage and exemplified as a faucet. In carrying out the invention the seat is carried by a bonnet post on which the valve disc closes and the operating mechanism of the valve is mounted on this post so that the seat and the valve disc as a whole may be removed and the seat renewed. One of the features of the invention is to operate such a valve through the post without delivering to the valve disc any wearing or rotative movement. Another feature of the invention is to close the disc with a positive pre-determined pressure so that the disc may be relieved of excessive pressure which will ruin the seat. Other features of the invention will appear from the specification and claims.

The invention is illustrated in the accompanying drawings as follows:—

Fig. 1 shows a central vertical section through the valve.

Fig. 2 a section on the line 2—2 in Fig. 1.

1 marks the valve body. This has an inlet 2 and outlet 3 supported by the usual diaphragm 4. A seat 5 is arranged on the upper surface of the diaphragm and a bonnet extension 6 is arranged above the diaphragm and a bonnet post 7 in the form of a sleeve extends upwardly from the valve seat into the bonnet extension. A seat 8 of seating material is arranged at the bottom of the post and is retained in place by an annular shoulder 9. This seat makes a permanent closure on the seat 5 on the top of the diaphragm.

The post has the radial openings 10 which communicate with the center of the sleeve and the center of the sleeve communicates with the inlet end of the valve.

A valve disc 11 is arranged at the inlet end of the post and seats on the seating ring 8. It has a stem 12 which extends upwardly into the post. An extension 13 is screwed on to the stem 12, this extension being provided with a shoulder 14. A spring 15 is arranged around the stem and extension 13 and is seated on an internal shoulder 7$^a$ at the bottom of the bonnet post and exerts pressure against the shoulder 14 thus tending to close the valve with a positive pressure.

A screw cap 17 is secured to the upper end of the post 7 and a screw 18 operates in the screw-threads 19 in the screw cap, the end of the screw 18 having a socket receiving the end of the projection 13 and the upper end of the projection operating against the end of the socket. This screw is of quick action and when screwed downwardly operates against the valve disc to force the same downwardly against the action of the spring so as to open the valve. When the screw is released the spring closes the valve. It will be noted that the operation of the screw has no opposing effect on the valve nor does the rotation of the screw affect a rotation of the valve disc. A stem 20 extends from the screw 18 and this is provided with the usual operating handle 21.

A union nut 22 is screwed on to the extension 6. It has an internal shoulder engaging a shoulder 23 on the screw cap 17. A packing 24 is arranged around the stem in a stuffing box 25. The bottom of the gland is formed by a washer 26 which rests on a shoulder in the screw cap 17. A closure nut 27 is screwed over the top of the screw cap and operates against the packing in the usual manner. It will readily be seen that by the removal of the union nut the bonnet post and the entire working parts of the valve can be readily removed and a new seating ring, or valve disc readily provided.

What I claim as new is:—

1. In a valve, the combination of a body having a bonnet extension and diaphragm with a valve opening therein in alinement with the extension; a removable hollow bonnet post in the extension; a seat ring at the bottom of the post acting as a gasket between the post and diaphragm and forming a seat for a valve disc; a valve disc operating on said seat ring; and removable with the post, said disc having a shouldered stem thereon; a spring seated on the post and exerting pressure on the shoulder to close the valve and means acting from within the post and acting against the stem for opening and closing the valve disc.

2. In a valve, the combination of a valve body having a bonnet extension and diaphragm with a valve opening therein in alinement with the extension; a removable hollow bonnet post in the extension having a seat at its bottom; a valve disc closed on the seat and having a stem, said stem having a shoulder-bearing thereon; a spring seated on the post and exerting pressure on the shoulder to close the valve; a screw cap on the post; and a screw in the cap acting on the stem, said screw being free to rotate relatively to the stem.

In testimony whereof I have hereunto set my hand.

JAMES E. HAZELTINE.